United States Patent [19]
Webb et al.

[11] Patent Number: 5,352,780
[45] Date of Patent: * Oct. 4, 1994

[54] ABSORBENT MATERIAL AND LITTER FROM GROUND CELLULOSE

[75] Inventors: John L. Webb, Richmond; Robert D. Kilgore, Rosharon; Shitalprasad N. Patil, Houston, all of Tex.

[73] Assignee: Ecosorb International, Inc., Houston, Tex.

[*] Notice: The portion of the term of this patent subsequent to Mar. 23, 2010 has been disclaimed.

[21] Appl. No.: 905,021

[22] Filed: Jun. 26, 1992

Related U.S. Application Data

[63] Continuation-in-part of Ser. No. 746,938, Aug. 19, 1991, Pat. No. 5,195,465, which is a continuation-in-part of Ser. No. 383,167, Jul. 20, 1989, Pat. No. 5,082,563.

[51] Int. Cl.$^5$ .................. A01K 29/00; C08B 15/00
[52] U.S. Cl. ..................... 536/56; 536/124; 524/35
[58] Field of Search ................. 536/56, 124; 524/35

[56] References Cited

U.S. PATENT DOCUMENTS

| | | | |
|---|---|---|---|
| 12,882 | 5/1855 | Weiser . | |
| 374,208 | 12/1887 | Sewall . | |
| 1,718,507 | 6/1929 | Wenzel et al. . | |
| 1,978,125 | 10/1934 | Bennett | 91/68 |
| 2,179,591 | 11/1939 | Godchaux . | |
| 2,470,641 | 5/1949 | Portz | 252/62 |
| 2,553,731 | 5/1951 | Oliver | 117/137 |
| 3,027,326 | 3/1962 | Moffett | 252/62 |
| 3,675,625 | 7/1972 | Miller et al. | 119/1 |
| 4,082,532 | 4/1978 | Imhof | 71/8 |
| 4,085,704 | 4/1978 | Frazier | 119/1 |
| 4,187,983 | 2/1980 | Boyer | 239/9 |
| 4,258,660 | 3/1981 | Pris et al. | 119/1 |
| 4,263,873 | 4/1981 | Christianson | 119/1 |
| 4,296,709 | 10/1981 | Schulein, Jr. | 119/1 |
| 4,343,680 | 8/1982 | Field et al. | 162/100 |
| 4,360,440 | 11/1982 | Boyer et al. | 252/62 |
| 4,374,794 | 2/1983 | Kok | 264/122 |
| 4,407,231 | 10/1983 | Colborn et al. | 119/1 |
| 4,519,918 | 5/1985 | Ericsson et al. | 210/680 |
| 4,794,022 | 12/1988 | Johnson et al. | 427/212 |
| 4,821,677 | 4/1989 | Harrison | 119/1 |
| 4,829,045 | 5/1989 | Fransham | 502/401 |
| 4,923,121 | 5/1990 | Boyer | 239/434.5 |
| 4,931,139 | 6/1990 | Phillips | 162/100 |
| 4,949,672 | 8/1990 | Ratcliff et al. | 119/1 |
| 5,009,908 | 4/1991 | Molaug et al. | 426/454 |
| 5,014,650 | 5/1991 | Sowle et al. | 119/171 |
| 5,018,482 | 5/1991 | Stanislowski | 119/173 |

FOREIGN PATENT DOCUMENTS

| | | |
|---|---|---|
| 1107267 | 8/1981 | Canada . |
| 0039522 | 11/1981 | European Pat. Off. . |
| 0094363 | 11/1983 | European Pat. Off. . |
| 0115898 | 8/1984 | European Pat. Off. . |
| 0223431 | 5/1987 | European Pat. Off. . |
| 0331207 | 9/1989 | European Pat. Off. . |
| 1542263 | 5/1970 | Fed. Rep. of Germany . |
| 2205641 | 11/1972 | Fed. Rep. of Germany . |
| 2725687C2 | 12/1978 | Fed. Rep. of Germany . |
| 2162689 | 6/1971 | France . |
| 118199 | 2/1947 | Sweden . |

OTHER PUBLICATIONS

Composted Municipal Garbage for Broiler Litter, by Malone et al., 1982.

(List continued on next page.)

*Primary Examiner*—Nathan M. Nutter
*Attorney, Agent, or Firm*—Guy McClung

[57] ABSTRACT

Cellulose flakes and methods for making them; in one aspects the flakes useful as animal litter or bedding; in one aspect such used flakes re-pelletized for use as litter, food or fertilizer.

Method for absorbing, removing, and for cleaning up a first liquid floating on or in a second liquid, the method employing absorbent pellets which, in preferred embodiments, have a particular size, density, and configuration. A pallet and a method for making the pellet for cleaning up a first liquid floating on or in a second liquid; and a method for making pellets for absorbing a combustible material to produce fuel pellets. A method for producing fuel pellets. In one aspect such materials with surface active agent therein and/or thereon and methods for producing such materials.

30 Claims, 2 Drawing Sheets

OTHER PUBLICATIONS

Influence Of Litter Type and Size on Broiler Performance: 1. "Factors Affecting Litter Consumption," Malone et al. 1982 Recycled Paper Products as Broiler Litter, by Malone et al., 1982.

Influence of Litter Type and Size on Broiler Performance: 2. Processed Newspaper Litter Particle Size and Management by Malone et al., 1982.

"Final Report," Cabe Associates, Inc., Nov. 1991 (not prior art), SorbaSolv, Omni Division of Ajax NERAC Search Report, refers to numerous prior art references.

"Animal Bedding—a capital idea," Resource Recycling, Jul., 1990.

"Broiler Litter Makes Hits Stocker Program Work," Progressive Farmer, Jun. 1991.

"Cows Munch Litter Pellets," Progressive Farmer, May, 1991.

"Waste Age's Recycling Times," Sep. 25, 1990.

Cincinnati Fiber, Inc., "Material Safety Data Sheet," 1987.

International Cellulose Corporation, "Celbar 2 Loose Fill Cellulose Insulation," Feb. 1988.

International Cellulose Corporation, "K-13 fc Ceiling Systems," 1987.

"Material Safety Data Sheet", Cincinnati Fiber, Inc., Dec. 18, 1987.

"Celbar 2 Loose Fill Cellulose Insulation", International Cellulose Corporation, Feb. 1988.

"K-13 fc Ceiling Systems Acoustics and Noise Control", International Cellulose Corporation, 1987.

"Cell Dry TM —Gobbler TM ", Cincinnati Fiber Inc.

"Used by Professional Mechanics to Soak Up Oil Spills and Keep Floors Spotless", Oil–Dri.

"Kitty Flush", Absorptive Technology Inc.

"All Purpose Absorbent Granular Calcined Clay", Balcones Mineral Corp.

"Hydrovac", J. V. Manufacturing Co., Inc.

"When Seconds Count, Remember: Only a Pig* Can Eat All This.", New Pig Corporation, 1987.

"Conwed Industrial Sorbent Products", Conwed Bonded Fiber, May 1984.

"Spill Problems? The SPC Solution for Spill Clean Up In-Plant, On Land Or In Water.", Sorbent Products Company, Inc., 1988.

Cincinnati Fiber, Inc., "Cell Dry (TM)–Gobbler (TM)," dated prior to May, 1988.

Oil–Dri Corporation of America, "Oil–Dri," (product bag) 1983.

Absorptive Technology, Inc., "Kitty Flush," product bag), dated prior to May, 1988.

Balcones Mineral Corp., "Absorb–N–Dry," (product bag) dated prior to May, 1988.

J. V. Manufacturing Co., Inc., "Hydrovac," 1987.

New Pig Corporation, "Only a Pig Can Eat All This," 1987.

Conwed Corp., "Conwed Industrial Sorbent Products," 1984.

Sorbent Products Co., Inc., "The SPC Solution," dated prior to May, 1988.

ABSORBENT MATERIAL AND LITTER FROM GROUND CELLULOSE

BACKGROUND OF THE INVENTION

1. Related Application

This is a continuation-in-part of U.S. application Ser. No. 746,938 filed on Aug. 19, 1991 entitled "Material For Litter, Food, And Fertilizer," and now U.S. Pat. No. 5,195,465 which is a continuation-in-part of U.S. application Ser. No. 383,167 filed on Jul. 20, 1989 and issued as U.S. Pat. 5,082,563 on Jan. 21, 1992.

2. Field of the Invention

This invention relates to absorbent cellulose material, to such material with surface active agent, methods for producing such material, and to such material useful as an animal litter. This invention also relates to processed cellulose material for use as an animal litter, as a food, and as a fertilizer.

This invention also relates to methods for cleaning up a liquid floating on or in another liquid and to absorbent pellets useful in such methods. In one embodiment, this invention relates particularly to methods for cleaning up oil spills in salt water using cellulose pellets of a preferred size, configuration and density. This invention relates to methods for making absorbent pellets and to the pellets themselves.

3. Description of the Prior Art

A variety of materials have been used as litter for animals. These materials have included grass, hay, leaves, grain hulls, sawdust, wood shavings, and other natural materials as well as material such as shredded or macerated paper. A variety of problems are associated with the use of these materials. Shredded or macerated paper readily absorbs liquids, including animal urine, but easily becomes saturated, losing its ability to dry up urine. Such paper also becomes packed down by the weight of the animals and loses its loft; i.e., it does not serve well as a bedding for animals, e.g. cattle and horses. Such paper which has not been sterilized or dried prior to use as a litter or bedding provides a prime site for bacterial or fungal growth and for ammonia production, particularly when aided by animal urine or manure. Natural materials which already have bacteria or other microorganisms on them and which have not been dried or sterilized also provide a prime site for such growth and production.

Prior art feed pellets made from chicken litter (75% litter, 25% grain; 50% litter, 50% corn) are relatively low in nitrogen content so grain or corn is added. Also such pellets have little or no trace minerals which add nutritional value.

Various methods, materials, and apparatuses have been used to clean up liquid spills such as oil spills. These methods, materials, and apparatuses are ineffective at best and costly, and non-productive at worst. Several weeks after the Exxon Valdez oil spill, only a small percentage of the spilled oil had been cleaned up. Even with spills of lesser magnitude, the clean up devices are complex and expensive and the methods are ineffective.

There has long been a need for an effective animal litter. There has long been a need for such a litter in which bacteria growth is inhibited or in which bacteria (or other unwanted organisms, fungi, molds, toxins, etc.) does not grow as well as in prior art litters. There has long been a need for such a litter which disposed of in a useful way or which can be reprocessed to produce a food or fertilizer. There has long been a need for a quick and efficient method for cleaning up spilled hazardous, obnoxious, or toxic materials, including but not limited to, oil, chemicals, and petroleum products.

There has long been a need for a method for cleaning oil spills which itself does not result in other environmental or disposal problems. There has long been a need for a method for cleaning up material spills which permits recovery or re-use of some of the spilled material. There has long been a need for a product for use in such methods.

In accordance with the duty of candor before the Patent and Trademark Office, the following are disclosed:

"Animal Bedding—a capital idea," Resource Recycling, July, 1990 discusses the use of shredded newspaper as animal bedding and lists fifteen reasons (page 46) why paper bedding is preferred to other bedding materials. Various machines are also disclosed.

"Broiler Litter Makes Hits Stocker Program Work," Progressive Farmer, June, 1991, discusses the use of broiler litter blended half and half with corn as calf feed and a 55% litter - 45% corn, plus hay, feed for steers.

"Cows Munch Litter Pellets," Progressive Farmer, May, 1991, discloses steam cooking a mixture of grain and broiler litter into feed pellets (75% litter, 25% grain), in a process that kills active bacteria and produces a pellet with a high protein content. This reference mentions problems with litter disposal and with drugs used in broiler rations.

"Waste Age's Recycling Times," Sep. 25, 1990, discusses in general the recycling of old newspaper, particularly pages 1, 3, 5, 9, 11.

U.S. Pat. No. 4,360,440, commonly owned with this application, discloses an insulating mixture with cellulose for fiber, water, and adhesive.

U.S. Pat. No. 4,187,983, commonly owned with this application, discloses a spray nozzle for spraying a multi-component insulating mixture of insulating fibers and adhesive.

U.S. Pat. No. 4,923,121 commonly owned with this application, discloses a nozzle for spraying insulating material mixtures including cellulose fibers.

U.S. Pat. No. 3,027,326 discloses a shredded fiber insulating material treated to improve resistance to charring and to provide a lower coefficient of heat transfer.

U.S. Pat. No. 2,553,731 discloses flame resistant cellulose fibers.

U.S. Pat. No. 2,470,641 discloses a cellulose insulation material made from disintegrated newspaper and boric acid powder.

U.S. Pat. No. 1,978,125 discloses a method for applying an insulation mixture including cellulose (paper) fiber.

U.S. Pat. No. 1,718,507 discloses a method for applying an insulating mixture including cellulose material.

U.S. Pat. No. 374,208 discloses a process for preserving wood.

U.S. Pat. No. 12,882 discloses an insulation material including macerated waste paper and forming a paste.

Cincinnati Fiber, Inc., "Material Safety Data Sheet," 1987 discloses cellulose fiber produced from recycled newspaper for use as an absorbent.

International Cellulose Corporation (assignee of present invention and this application), "Celbar 2 loose fill cellulose insulation," February 1988, discloses insulating cellulose fibers.

International Cellulose Corporation, "K-13 fc ceiling systems," 1987 discloses an insulating material including cellulose fibers.

Cincinnati Fiber, Inc., "Cell Dry (TM)-Gobbler (TM)," dated prior to May, 1988, discloses absorbent tubes with a granular absorbent having a wicking action suitable for absorbing oil or other liquids.

Oil-Dri Corporation of America, "Oil-Dri," (product bag) 1983, discloses ground clay for soaking up liquid spills on surfaces, including oil spills on floors, workbenches, and driveways.

Absorptive Technology, Inc., "Kitty Flush," (product bag), dated prior to May, 1988, discloses an absorbent cellulose fiber for, among other things, absorbing water and oil spills.

Balcones Mineral Corp., "Absorb-N-Dry," (product bag) dated prior to May, 1988, discloses absorbent granular calcined clay for absorbing oil, grease, odors, moisture, and liquids.

J.V. Manufacturing Co., Inc., "Hydrovac," 1987 discloses a vacuum system for cleaning up spills of hazardous materials, including oil. The brochure mentions U.S. Pat. No. 4,194,978.

New Pig Corporation, "Only A Pig Can Eat All This," 1987, discloses devices with a superabsorbent material for cleaning up spills of hazardous materials.

Conwed Corp., "Conwed Industrial Sorbent Products," 1984, discloses sorbent devices with a water-resistant biodegradable natural fiber mat reinforced with polypropylene mesh which, after clean up, can be wrung out to reclaim the absorbed material or can be incinerated.

Sorben Products Co., Inc., "The SPC Solution," dated prior to May, 1988, discloses devices and pads using a non-biodegradable sorben material and Fiberperl, a combination of cellulose and perlite in particulate, boom, or pillow embodiments.

U.S. Pat. No. 4,924,808 discloses a litter for small animals made from powdered straw which is pressed into briquettes which are broken into irregular fragments a few millimeters in size.

U.S. Pat. No. 5,085,175 discloses an animal litter made from seed hulls with oil that are pelletized without substantial additional adhesive or binder.

U.S. Pat. No. 4,931,139 discloses a particulate absorbent material that is explicitly not pelletized and is made from waste cellulose fibers mixed with water, a latex emulsion, aluminum sulfate and a flocculant forming a slurry. Water is removed from the slurry to form a mat or presscake which is shredded and then tumbled in a water mist in the presence of a surfactant to condition the material by folding in projecting fibers and to enhance wettability. The material is then dried to a solids content of at least 75%.

U.S. Pat. No. 4,263,873 discloses an animal litter comprising a cellulose material with a pheromone-like attractant. The material is pelletized with sufficient water to hold the pellets together.

U.S. Pat. No. 5,084,349 discloses hollow cellulose fibers, each having a microporous wall having micropores and defining a lumen.

U.S. Pat. No. 4,537,877 discloses a particulate oil-absorbing composition having hydrophobic cellulose pulp fibers and inorganic cellulose paper pulp filler. Possible additives are: retention agents, latex, pigments size or resin polymer or prepolymer, or wax dispersion.

U.S. Pat. No. 4,670,156 discloses a hydrophobic sorbent which is made by subjecting water-containing fibrous cellulose to rapid heating to cause expansion of the fibers through gasification of the water therein.

SUMMARY OF THE PRESENT INVENTION

The present invention, in one embodiment, is directed to absorbent cellulose material having surface active agent(s) therein and/or thereon and to methods for producing such material. In another embodiment such material is formed into pellets which are expanded and, in one specific aspect, used as animal litter.

The present invention in one embodiment is directed to an animal litter made from compacted cellulose (e.g. old newspaper) which has been made into pellets and then flaked, e.g. by crimping and compressing. The pellets are produced in a process which includes a heating step at a sufficient temperature and for a sufficient time period that bacteria and other undesirable living things (organisms, viruses, fungi, molds, eggs, larva, adult insects, microorganisms) are killed, preferably substantially all of them. Also, this process produces a "hot" pellet which dries out (prior to the flaking operation). In this drying step, the pellet opens up somewhat. A dry sterile flaked material provides a less conducive site for the growth of bacteria, fungi, or mold, or for ammonia production. Also, this material produces relatively little dust.

In one process for producing the flaked material according to this invention, the pellets are cut to a size of about half an inch and are then fed between dual opposed rollers of a trimper where they are compressed to increase their surface area.

A fungicide, but not limited to e.g. borax, boric acid, lime or sodium bicarbonate, can be added (e.g. in powdered form) to the flaked material to extend the useful life of litter made from the flaked material. Coloring agents, insecticides and herbicides can also be introduced into the flaked material.

Flaked material made according to this invention can be used as an animal litter for a longer time period than can litters made from natural materials or from other materials that are not processed as described herein. Due to the configuration, density, and size of flakes of the flaked material, urine or other liquids is more readily absorbed and cannot as easily flow through a mass of the material as it can, e.g., through a mass of shredded paper. This inhibits the formation of puddles beneath the material, thus inhibiting the formation of bacteria breeding sites.

In another embodiment of this invention, flaked material which has been used as an animal litter, and has absorbed animal urine and liquids from manure (e.g. but not limited to chicken manure), is made into pellets in a pelletizing process in which, in a heating step, bacteria and other undesirable living organisms are killed. This sterilized repelletized material is an excellent food source for animals, including but not limited to poultry and ruminant animals. Additives for such re-pelletized material include medicines, minerals and vitamins. In another embodiment flaked material that has been used as litter is introduced back into a pelletizing machine with an additional amount of conditioned cellulose fiber to produce a material that is then flaked and used as a litter or as a food source. This process may be repeated.

Flaked material according to this invention is digestible by poultry so that it does not compact in their gizzards as do some other prior art litters.

Flaked material used as litter for animals may also be re-pelletized, with or without a killing-heating step, to produce a pellet usable as fertilizer.

By appropriately sizing the flaked material according to the present invention, compaction of the material by animal weight is reduced and the tendency of the material to adhere to animal feet (e.g. to the feet of poultry or cattle) is reduced. In one embodiment pieces of the material are irregularly shaped and are about one-half inch long, about one-fourth inch wide and about one-eighth inch thick and their density is about 15 to about 22 pounds per cubic foot. Enough of the material is used, preferably, to absorb urine and manure, to control odor, and to prevent build-up on animal feet. Such material is not as easily moved around by animals as, e.g., shredded newspaper; i.e., material according to this invention stays more uniformly in place to cover a given area.

Due to the relatively dry and sterile nature of flaked material according to the present invention, when the material is used as animal litter, it can be removed before it emits an inordinate amount of undesirable odor, e.g. due to ammonia. This makes it easier to either dispose of or work with later.

Certain embodiments of the present invention are directed to: methods for absorbing a first liquid floating on or in a second liquid by using absorbent pellets; to absorbent pellets; and to methods for making the pellets; and to pellets produced by the absorption method. One embodiment of an absorbing method according to this invention for use in cleaning up a first liquid floating on or in a second liquid includes the steps of introducing pellets, preferably made from cellulose, onto or into the first liquid which pellets absorb some or all of the first liquid and then sink beneath the location of the first liquid to a point at which they are recovered or to the bottom of the container, reservoir, or body of the second liquid. In another embodiment, the pellets can be recovered from the location of the first liquid before they sink. In another embodiment of the method, a surfactant sprayed on the pellets may facilitate absorption of the first liquid and decrease the time necessary to cause sinking of the pellets.

In at least preferred embodiments, pellets according to this invention, have a preferred range of densities. In other preferred embodiments, pellets have a preferred range of sizes. In other preferred embodiments, pellets have various preferred configurations. One specific preferred pellet has a preferred range of densities, a preferred range of sizes, and a preferred configuration.

In certain embodiments it is preferred that the flaked material for use as a litter (or for re-use as described above) be formed so that pieces of the flaked material are ridged for additional structural strength and integrity.

One embodiment of a method for making cellulose pellets according to this invention includes the steps of preparing raw cellulose such as paper into a form that can be introduced to subsequent pelletizing steps. In one embodiment, correctly sized cellulose particles are conditioned with water then fed to and through a pelletizing machine which produces pellets. In a preferred embodiment, these pellets are then sized and shaped to desired specifications. Some or all of the undesirable pellets and particles (e.g., dust) can be removed (and re-used). The resulting compressed pellets are useful in various methods. From an amount of compressed pellets that are then flaked, dust and pieces of undesirable size and configuration are also, preferably, removed, e.g. by shaker screens.

There are, therefore, objects of at least certain preferred embodiments of the present invention as follows:

To provide absorbent cellulose material with surface active agent therein and/or thereon; methods for making such material; such material in fibrous form; such material that is pelletized and expanded; such material that is useful as litter; and methods for making such litter;

To provide new, useful, unique, effective and nonobvious material for use as animal litter, food, or fertilizer;

To provide such material for use as animal litter which is relatively dry and sterile for inhibiting the growth of undesirable living organisms including bacteria;

To provide such material which serves as a soft animal bedding material not as subject to compaction as certain prior art materials;

To provide such material which produces relatively little dust;

To provide such material which is combinable with a fungicide, herbicide, insecticide, and/or coloring material;

To provide such material with relatively higher absorption which can be used for a longer time period as a litter than certain prior art materials;

To provide such a material which can be re-pelletized for use as litter, food, fertilizer, or mulch;

To provide such materials which can have various beneficial additives;

To provide such materials which are biodegradable;

To provide a new, unique, useful, and nonobvious method for absorbing a first liquid floating in or on a second liquid; e.g., but not limited to, a method for cleaning up oil spills in fresh or salt water;

To provide such materials which are corrugated for added strength and integrity;

To provide new, unique, and nonobvious pellets for absorbing a first liquid floating on or in a second liquid; e.g., but not limited to, cellulose pellets of a particular size, configuration, and density;

To provide new, unique, useful, and nonobvious methods for fabricating such pellets for use in such methods;

To provide new, unique, useful, and nonobvious methods for using such pellets and such methods to produce a pellet which has absorbed combustible material or petroleum products and can subsequently be used as a fuel pellet or can be introduced into a recovery process for recovering the petroleum product, or to produce a pellet which can absorb a liquid and which can then be treated or handled to remove the liquid;

To provide a method for cleaning up oil spills in which the pellets used absorb oil floating on water and then sink to the bottom where they biodegrade;

To provide such a method which works well with either natural agitation of the water such as by wind or wave action or in which artificial agitation can be employed to facilitate absorption and to speed-up sinking of the pellets;

To provide a method in which pellets are recovered from a layer of oil or other material before they sink or before they come to rest on the bottom of the container or reservoir, either manually or by mechanical means;

To provide a method in which pellets can be used to absorb a combustible material such as crude oil and hold it at or near the surface of another liquid so that it (and the pellets) can be burned before it mixes with the other liquid or sinks;

To provide a method for producing a cellulose pellet for use in the other methods according to this invention, including the steps of grinding raw paper in a mill to produce particles or pieces which are conditioned with water and metered to a pelletizing machine in which it is extruded to produce pellets of increased density; the pellets are dried, sized, and shaped;

To provide pellets useful in all of the methods described herein;

To satisfy the long-felt needs for a quick and efficient method for cleaning up spilled hazardous, toxic, or obnoxious materials such as chemicals, petroleum products, and crude oil;

To satisfy the long-felt need for a method for cleaning up material which permits recovery or re-use of some of the material;

To satisfy the long-felt need for a method for cleaning up such spills which itself does not result in other environmental or disposal problems;

To satisfy the long-felt need for a produce useful in such methods;

To provide methods for controlling a first liquid floating in or on a second liquid; particularly oil floating on water;

To provide compressed absorbent pellets, preferably made from newsprint, which are designed and made to float or sink after absorbing an unwanted liquid, depending on the particular application.

The present invention recognizes and addresses the previously-mentioned long-felt needs and provides an elegant, creative and satisfactory meeting of those needs in its various embodiments. To one of skill in this art who has the benefits of this invention's teachings and disclosures, other and further objects and advantages will be clear, as well as others inherent therein, from the following description of presently-preferred embodiments, given for the purpose of disclosure, when taken in conjunction with the accompanying materials. Although these descriptions are detailed to insure adequacy and aid understanding, this is not intended to prejudice that purpose of a patent which is to claim an invention no matter how others may later disguise it by variations in form or additions or further improvements. The claim at the end of this specification are intended for this purpose.

BRIEF DESCRIPTION OF THE DRAWING

So that the manner in which the above-recited features, advantages and objects of the invention, as well as others which will be better understood, a more particular description of the invention briefly summarized above may be had by reference to the detailed description of certain preferred embodiments thereof, and the materials which are illustrated in the appended photographs which form a part of this specification. It is to be noted, however, that the appended photographs illustrate preferred embodiments of the invention and are therefore not to be considered limiting of its scope, for the invention may admit to other equivalent and equally effective embodiments.

DESCRIPTION OF PREFERRED EMBODIMENTS

In one preferred embodiment of a process according to the present invention for producing absorbent pellets, cellulose in sheet or board form, preferably Kraft paper, cardboard, or newsprint, with newsprint most preferred, is ground up. The newsprint is fed into a commercially available first stage mill that reduces the paper to pieces in the range of about one inch to about one and a half inches. These pieces are then fed to a finishing mill where they are further reduced to pieces in the range of about one-eighth inch to one-fourth inch in size (largest dimension). These pieces of newsprint are then conditioned with a water spray. [For liquid absorption pellets, it is preferred that the moisture content be in the range of about 12% to about 14% weight, with 13% preferred. For flaked material (crimped and compressed pellets) to be used as litter, it is preferred that the water content be between about 12% to about 20% by weight (with about 15% to about 18% preferred).]

The conditioned newsprint material is then fed into a special pelletizing machine (commercially available model machine 26-300 made by Sprout Bauer Company), that extrudes the material through a die to form pellets. The conditioned newsprint at about four to about seven pounds per cubic foot is fed to the pelletizing machine to produce pellets which are in the preferred density range of about 37 to 47 pounds per cubic foot. The size of the pellets produced by the machine varies. In one embodiment a preferred pellet is generally cylindrical and has a diameter in the preferred range of about one-eighth inch to about one-fourth inch and a length in the preferred range of about one-eighth inch to about three-fourths inch long; the preferred density for this pellet is about 42 pounds of cellulose material per cubic foot. It is preferred that these pellets be dried and the preferred range of moisture content after drying is from about 8% moisture by weight to about 10% moisture by weight. These dried pellets are then further processed; two preferred embodiments resulting from further processing are flaked material (described below) and pellets (described below).

Figure 1:
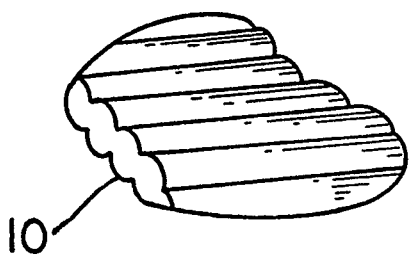
FIG. 1 is a perspective view of a piece of corrugated flaked material according to the present invention.
Figure 2:
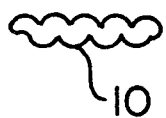
FIG. 2 is an end view of a piece of currugated flaked material according to the present invention.
Figure 3:
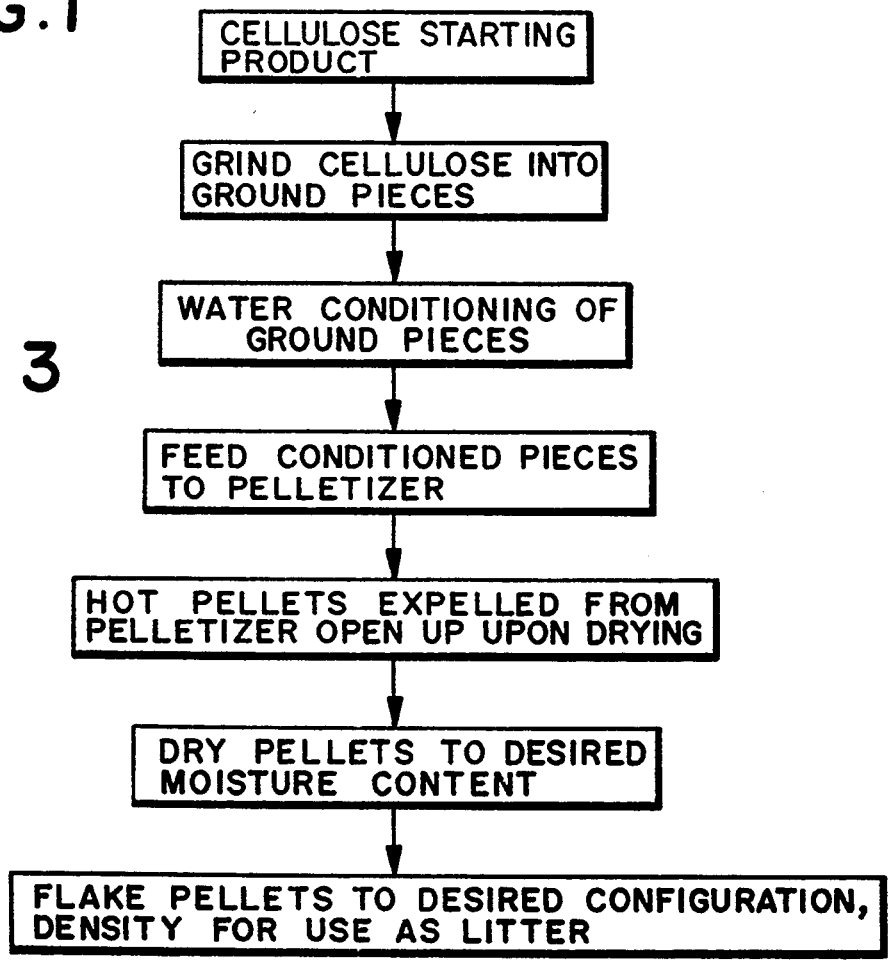
FIG. 3 shows schematically a method according to the present invention.
Figure 4:
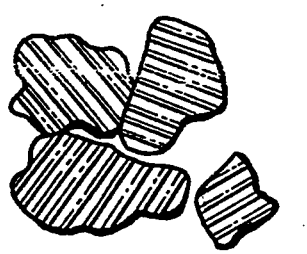
FIGS. 4, 5, and 6 are top views of material according to the present invention.
Figure 5:
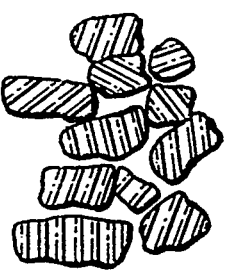
Figure 6:

In one embodiment the conditioned newsprint material is heated in the pelletizing machine sufficiently to kill undesirable living organisms, e.g. mold and bacteria. The dried cellulose pellets, in this embodiment, range preferably between about one-eighth inch to about three-quarters inch in length with a length of about one-half inch preferred. These pellets are then fed to a roller mill (e.g., Model FRC 936, Roskamp Co.) wherein they are compressed and flattened between dual opposed rollers which increase the material's surface area, preferably by at least 35% and produce a flaked material. It is preferred that the density of the flaked material range between about 15 to about 22 pounds per cubic foot, with about 20 pounds per cubic foot preferred. It is preferred that the flaked material be about one-eighth to about five-sixteenth of an inch in size. Fungicides such as borax or sodium bicarbonate may be added to these flakes. This flaked material may be used as an animal litter or bedding material. In a preferred embodiment the flakes are dried to a moisture content between about 8% to about 12% by weight. With this size or pieces of flaked material it is possible and it is preferred to impart a regular corrugated shape to the material with the roller mill to increase the surface area, strength and integrity of the pieces. This shape is illustrated by the piece of material 10 (FIG. 1) according to this invention.

In another embodiment of the present invention flaked material as described above (or *any* cellulose material, pellet or flake) that has been used as animal litter is collected and introduced into a pelletizing machine with or without the addition of cellulose fiber conditioned as described above in which the materials are heated sufficiently to kill undesirable living organisms, preferably substantially all of them. It is preferred that an amount of cellulose equal by weight to about 20% to about 35% of the weight of cellulose in the used litter be added. The pellets thus produced may serve: as food for ruminant animals; litter or as mulch or fertilizer. When used as food, the pellets may have additives added to them such as minerals, vitamins and medicines to make a more complete feed. These pellets are, preferably, between about one-quarter inch and three-quarters of an inch in diameter and between about one inch and three inches in length.

When the material described above is used as an animal litter then collected and re-pelletized to form "re-pellets", the re-pellets may be used as an effective fertilizer. The re-pellets themselves may be broadcast on soil around plants or trees or inserted into the soil or mixed with water or other liquids in a container to be applied to plants or trees. Plant nutrients, fungicides, minerals, insecticides and/or herbicides may be added to the re-pellets when they are to be used as fertilizer.

The flaked material according to this invention is biodegradable, even after use as an animal litter. The flaked material prior to use as an animal litter, or thereafter, is an excellent mulch material.

Table IV presents an analysis of flaked material according to this invention which was used as poultry litter and contained typical turkey urine and manure. The table shows the various food and mineral values contained therein.

TABLE I

TEST: 1 ABSORPTION OF OIL/WATER BY A, B, C, D, E, F, G, H & I PELL

DATE: 5-3-89 & 5-4-89, TIME STARTED: 2:00 P.M., TEMPERATURE OF OIL/WATER = 23 DEGREES C., pH OF WATER = 7.83; WEIGHT OF SAE 90 OIL = 5.15 GRAMS; WEIGHT OF VISCOUS OIL = 4.23 GRAM; AREA OF OIL SPREAD = 4.91 INCH[1]: 140 C.C. WATER USED.

| TIME & DATE | TYPE OF OIL | A | B | C | D | E | F | G | H* | I** |
|---|---|---|---|---|---|---|---|---|---|---|
| 2:30 P.M. 05-03-89 | SAE 90 | 90% ABSOR BED 0.0% SANK | 85% ABSORBED 0.0% SANK | 100.0% ABSORBED 5% SANK | 95% ABSORBED 0.0% | 100% ABSORBED 10% SANK | 100% ABSORBED 0.0% SANK | 99% ABSORBED 0.0% SANK | 100% ABSORBED 70% SANK | 100% ABSORBED 85% SANK |
| | VISCOUS OIL | 90% ABSORBED 10% SANK | 80% ABSORBED 0.0% SANK | 97% ABSORBED 10% SANK | 97% ABSORBED 5% SANK | 97% ABSORBED 20% SANK | 97% ABSORBED 10% SANK | 97% ABSORBED 10% SANK | 93% ABSORBED 90% SANK | 96% ABSORBED 96% SANK |
| 3:15 P.M. 05-03-89 | SAE 90 | 100% 100% SANK | 100% 5% SANK | 100% 40% SANK | 100% 5% SANK | 100% 40% SANK | 100% 0.0% SANK | 100% 5% SANK | 100% 85% SANK | 100% 100% SANK |
| | VISCOUS OIL | 100% ABSORBED | 100% ABSORBED | 100% ABSORBED | 100% ABSORBED | 100% ABSORBED | 100% ABSORBED | 100% ABSORBED | 100% ABSORBED | 100% ABSORBED |
| 3:45 P.M. 05-03-89 | SAE 90 | 20% SANK | 10% SANK | 30% SANK | 15% SANK | 50% SANK | 30% SANK | 75% SANK | 96% SANK | 100% SANK |
| | VISCOUS OIL | 20% SANK | 10% SANK | 55% SANK | 10% SANK | 60% SANK | 0.0% SANK | 10% SANK | 90% SANK | 100% SANK |
| 4:25 P.M. 05-03-89 | SAE 90 | 60% SANK | 15% SANK | 45% SANK | 20% SANK | 65% SANK | 40% SANK | 80% SANK | 96% SANK | 100% SANK |
| | VISCOUS OIL | 25% SANK | 15% SANK | 80% SANK | 13% SANK | 65% SANK | 0.0% SANK | 12% SANK | 90% SANK | 100% SANK |
| 4:55 P.M. 05-03-89 | SAE 90 | 65% SANK | 20% SANK | 50% SANK | 35% SANK | 70% SANK | 40% SANK | 80% SANK | 96% SANK | 100% SANK |
| | VISCOUS OIL | 30% SANK | 20% SANK | 60% SANK | 15% SANK | 75% SANK | 0.0% SANK | 15% SANK | 90% SANK | 100% SANK |
| 5:25 P.M. 05-03-89 | SAE 90 | 75% SANK | 40% SANK | 55% SANK | 80% SANK | 75% SANK | 55% SANK | 85% SANK | 96% SANK | 100% SANK |
| | VISCOUS OIL | 35% SANK | 25% SANK | 65% SANK | 15% SANK | 78% SANK | 0.0% SANK | 17% SANK | 90% SANK | 100% SANK |
| 5:55 P.M. 05-03-89 | SAE 90 | 80% SANK | 50% SANK | 55% SANK | 50% SANK | 75% SANK | 60% SANK | 85% SANK | 96% SANK | 100% SANK |
| | VISCOUS OIL | 35% SANK | 25% SANK | 65% SANK | 17% SANK | 75% SANK | 0.0% SANK | 20% SANK | 90% SANK | 100% SANK |
| 8:00 A.M. 05-04-89 | SAE 90 | 85% SANK | 65% SANK | 55% SANK | 55% SANK | 80% SANK | 65% SANK | 90% SANK | 96% SANK | 100% SANK |
| | VISCOUS OIL | 35% SANK | 25% SANK | 65% SANK | 20% SANK | 75% SANK | 10% SANK | 20% SANK | 90% SANK | 100% SANK |
| | VISCOUS OIL | 87% SANK | 75% SANK | 55% SANK | 60% SANK | 80% SANK | 90% SANK | 90% SANK | 96% SANK | 100% SANK |

*BUCKERFIELDS ABSORB MORE WATER THAN OIL FASTER AND SINK TO BOTTOM WITHIN 10 MINUTES. (SO 5-8% OIL REMAINS ALONG THE EDGE OF THE STYROFOAM CUP.)
**THESE LOW DENSITY, FLAT CHIPS ABSORBS, ALSO, WATER MORE THAN OIL AND SINKS FASTER IN 15 MINUTES BELOW THE SURFACE.

TABLE II

TEST: 2 ABSORPTION OF OIL/WATER BY A, B, C, D, E, F, G, H, I, J & K J & K
DATE: 5-4-89 & 5-5-89; TIME STARTED: 11:15 A.M.; TEMPERATURE OF OIL AND WATER = 9 DEGREES C.,
pH OF WATER = 8.02; WEIGHT OF SAE 90 = 5.15 GRAMS; WEIGHT OF VISCOUS OIL = 4.23 GRAMS;
AREA OF OIL SPREAD = 4.91 INCH$^2$. 140 C.C. OF WATER USED.

| TIME & DATE | TYPE OF OIL | ABSORBING OIL/WATER | | | | |
|---|---|---|---|---|---|---|
| | | A | B | C | D | E |
| 11:45 A.M. 05-04-89 | SAE 90 | 90% ABSO BED 0.0% SANK | 85% ABSORBED 0.0% SANK | 87% ABSORBED 0.0% SANK | 85% ABSORBED 0.0% SANK | 85% ABSORBED 0.0% SANK |
| | VISCOUS OIL | 95% ABSORBED 0.0% SANK | 80% ABSORBED 0.0% SANK | 90% ABSORBED 0.0% SANK | 80% ABSORBED 0.0% SANK | 85% ABSORBED 0.0% SANK |
| 12:25 P.M. 05-04-89 | SAE 90 | 98% ABSORBED 0.0% SANK | 90% ABSORBED 0.0% SANK | 95% ABSORBED 0.0% SANK | 90% ABSORBED 0.0% SANK | 90% ABSORBED 0.0% SANK |
| | VISCOUS OIL | 98% ABSORBED 0.0% SANK | 90% ABSORBED 0.0% SANK | 95% ABSORBED 0.0% SANK | 90% ABSORBED 0.0% SANK | 90% ABSORBED 0.0% SANK |
| 1:05 P.M. 05-04-89 | SAE 90 | 96% ABSORBED 0.0% SANK | 93% ABSORBED 0.0% SANK | 96% ABSORBED 0.0% SANK | 85% ABSORBED 0.0% SANK | 95% ABSORBED 0.0% SANK |
| | VISCOUS OIL | 96% ABSORBED 0.0% SANK | 95% ABSORBED 0.0% SANK | 97% ABSO 0.0% SANK | 95% ABSORBED 0.0% SANK | 95% ABSORBED 0.0% SANK |
| 2:05 P.M. 05-04-89 | SAE 90 | 100% ABSORBED 5% SANK | 96% ABSORBED 0.0% SANK | 100% ABSORBED 5% SANK | 96% ABSORBED 0.0% SANK | 100% ABSORBED 0.0% SANK |
| | VISCOUS OIL | 100% ABSORBED 0.0% SANK | 97% ABSORBED 0.0% SANK | 96% ABSORBED 5% SANK | 96% ABSORBED 0.0% SANK | 100% ABSORBED 0.0% SANK |
| 3:05 P.M. 05-04-89 | SAE 90 | 100% ABSORBED 5% SANK | 96% ABSORBED 5% SANK | 100% ABSORBED 5% SANK | 96% ABSORBED 0.0% SANK | 100% ABSORBED 0.0% SANK |
| | VISCOUS OIL | 100% ABSORBED 0.0% SANK | 100% ABSROBED 0.0% SANK | 100% ABSORBED 5% SANK | 96% ABSORBED 0.0% SANK | 100% ABSORBED 0.0% SANK |
| 4:05 P.M. 05-04-89 | SAE 90 | 100% ABSORBED 20% SANK | 100% ABSORBED 10% SANK | 100% ABSORBED 35% SANK | 100% ABSORBED 0.0% SANK | 100% ABSORBED 15% SANK |
| | VISCOUS OIL | 100% ABSORBED 40% SANK | 100% ABSORBED 0.0% SANK | 100% ABSORBED 10% SANK | 100% ABSORBED 10% SANK | 100% ABSORBED 20% SANK |
| 4:50 P.M. 05-04-89 | SAE 90 | 100% ABSORBED 25% SANK | 100% ABSORBED 20% SANK | 100% ABSORBED 40% SANK | 100% ABSORBED 0.0% SANK | 100% ABSORBED 30% SANK |
| | VISCOUS OIL | 100% ABSORBED 45% SANK | 100% ABSORBED 10% SANK | 100% ABSORBED 15% SANK | 100% ABSORBED 20% SANK | 100% ABSORBED 40% SANK |
| 8:00 A.M. 05-05-89 | SAE 90 VISCOUS OIL | 50% SANK 60% SANK | 30% SANK 40% SANK | 40% SANK 50% SANK | 25% SANK 55% SANK | 55% SANK 65% SANK |

| TIME & DATE | TYPE OF OIL | ABSORBING OIL/WATER | | | | | |
|---|---|---|---|---|---|---|---|
| | | F | G | H* | I** | J | K |
| 11:45 A.M. 05-04-89 | SAE 90 | 95% ABSORBED 0.0% SANK | 95% ABSORBED 0.0% SANK | 100% ABSORBED 85% SANK | 100% ABSORBED 100% SANK | 75% ABSORBED 0.0% SANK | GREY FIBER IS LIGHTER SO THE FIBERS IN CONTACT WITH THE OIL SURFACE ONLY ABSORBED THE OIL AND THE FIBERS ABOVE REMAINED DRY. THE ABSORBED FIBERS WERE FLOATING ON OIL. |
| | VISCOUS OIL | 95% ABSORBED 0.0% SANK | 90% ABSOBED 0.0% SANK | 100% ABSORBED 90% SANK | 100% ABSORBED 100% SANK | 65% ABSORBED 0.0% SANK | |
| 12:25 P.M. 05-04-89 | SAE 90 | 95% ABSORBED 5% SANK | 96% ABSORBED 5% SANK | 100% ABSORBED 87% SANK | 100% ABSORBED 100% SANK | 80% ABSORBED 0.0% SANK | |
| | VISCOUS OIL | 95% ABSORBED 0.0% SANK | 92% ABSORBED 0.0% SANK | 100% ABSORBED 90% SANK | 100% ABSORBED 100% SANK | 70% ABSORBED 0.0% SANK | |
| 1:05 P.M. 05-04-89 | SAE 90 | 97% ABSORBED 5% SANK | 99% ABSO BED 10% SANK | 100% ABSORBED 90% SANK | SAME AS ABOVE | 85% ABSORBED 0.0% SANK | |
| | VISCOUS OIL | 97% ABSORBED 5% SANK | 95% ABSO BED 0.0% SANK | 100% ABSORBED 100% SANK | SAME AS ABOVE | 75% ABSORBED 0.0% SANK | |
| 2:05 P.M. 05-04-89 | SAE 90 | 99% ABSORBED 5% SANK | 99% ABSORBED 15% SANK | 100% ABOVE 95% SANK | SAME AS ABSORBED | 90% 0.0% SANK | |
| | VISCOUS OIL | 99% ABSORBED 5% SANK | 95% ABSORBED 5% SANK | 100% ABSORBED 95% SANK | SAME AS ABOVE | 90% ABSORBED 0.0% SANK | |
| 3:05 P.M. 05-04-89 | SAE 90 | 99% ABSORBED 5% SANK | 99% ABSORBED 15% SANK | SAME AS ABOVE | SAME AS ABOVE | 95% ABSORBED 0.0% SANK | |
| | VISCOUS OIL | 99% ABSORBED 5% SANK | 95% ABSORBED 5% SANK | 100% ABSORBED 96% SANK | SAME AS ABOVE | 92% ABSORBED 0.0% SANK | |
| 4:05 P.M. 05-04-89 | SAE 90 | 99% ABSORBED 20% SANK | 99% ABSORBED 40% SANK | SAME AS ABOVE | SAME AS ABOVE | 95% ABSORBED 0.0% SANK | GREY FIBER SPREAD ON OIL/WATER SURFACE ABSORBS SOME OIL AND FORMS MAT OF ABSORBED FIBERS AND FLOATS. THE FIBERS ABOVE THAT MAT IS DRY. ONLY 2-3 GRAMS OF FIBER OIL ABSORBED EVEN AFTER 20 HOURS. |
| | VISCOUS OIL | 100% ABSORBED 30% SANK | 100% ABSORBED 30% SANK | 100% ABSORBED 99% SANK | SAME AS ABOVE | 95% ABSORBED 0.0% SANK | |
| 4:50 P.M. 05-04-89 | SAE 90 | 100% ABSORBED 30% SANK | 100% ABSORBED 50% SANK | SAME AS ABOVE | SAME AS ABOVE | 100% ABSORBED 5% SANK | |
| | VISCOUS OIL | 100% ABSORBED | 100% ABSORBED | 100% ABSORBED | SAME AS ABOVE | 100% ABSORBED | |

TABLE II-continued

TEST: 2 ABSORPTION OF OIL/WATER BY A, B, C, D, E, F, G, H, I, J & K J & K
DATE: 5-4-89 & 5-5-89; TIME STARTED: 11:15 A.M.; TEMPERATURE OF OIL AND WATER = 9 DEGREES C.,
pH OF WATER = 8.02; WEIGHT OF SAE 90 = 5.15 GRAMS; WEIGHT OF VISCOUS OIL = 4.23 GRAMS;
AREA OF OIL SPREAD = 4.91 INCH$^2$. 140 C.C. OF WATER USED.

| | | 50% SANK | 35% SANK | 99% SANK | | 5% SANK |
|---|---|---|---|---|---|---|
| 8:00 | SAE 90 | 45% SANK | 50% SANK | 95% SANK | 100% SANK | 20% SANK |
| A.M. | VISCOUS | 80% SANK | 85% SANK | 99% SANK | 100% SANK | 90% SANK |
| 05-05-89 | OIL | | | | | |

*BUCKERFIELD ABSORB WATER FASTER THAN OIL AND SINK TO BOTTOM WITHIN 10 MINUTES.
** THESE LOW DENSITY, FLAT CHIPS, ALSO, ABSORBED MORE WATER FASTER THAN OIL AND SANK BELOW THE SURFACE SO 8–10% SAE-90 OIL REMAINED FLOATING ON THE SURFACE. 25–30% VISCOUS OIL REMAINED AT THE EDGE OF CUP.
J & K BANK BELOW THE SURFACE ONLY.

TABLE III

| NOS. | VOLUME CUBIC CENTIMEMTERS | WEIGHT GRAMS | DENSITY GRAMS CUBIC CENTIMETERS | DENSITY POUNDS CUBIC FEET |
|---|---|---|---|---|
| A | 196 | 67.59 | 0.3448 | 21.53 |
| B | 196 | 67.54 | 0.3446 | 21.51 |
| C | 196 | 63.76 | 0.3253 | 20.31 |
| D | 196 | 72.48 | 0.3698 | 23.09 |
| E | 196 | 63.58 | 0.3244 | 20.25 |
| F | 196 | 93.19 | 0.4755 | 29.68 |
| G | 196 | 91.17 | 0.4652 | 29.04 |
| H | 84 | 37.51 | 0.4465 | 27.88 |
| I | 196 | 26.16 | 0.1335 | 8.333 |
| J | 200 | 50.53 | 0.2527 | 15.77 |
| K | 200 | 7.96 | 0.0398 | 2.48 |

TABLE IV

INDENTIFICATION: POULTRY MANURE PLUS FLAKED MATERIAL

| TEST (% by weight) | AS RECEIVED (Wet) | DRY |
|---|---|---|
| MOISTURE % | 12.88 | 0.00 |
| PROTEIN % | 11.88 | 13.64 |
| ASH % | 5.15 | 5.91 |
| FIBER % | 38.22 | 43.87 |
| CALCIUM % | 0.30 | 0.34 |
| PHOSPHORUS % | 0.03 | 0.03 |
| A.D.F. % | 52.43 | 60.18 |
| A.D.F.N. (PROTEIN EQUIVALENT) % | 1.91 | 2.19 |
| PEPSIN DIGESTIBLE PROTEIN (PROTEIN EQUIVALENT) % | 10.83 | 12.43 |
| POTASSIUM % | 0.59 | 0.68 |
| SODIUM % | 0.12 | 0.14 |
| ARSENIC PPM | 0.00 | 0.00 |
| IRON PPM | 71.90 | 82.53 |
| MANGANESE PPM | 107.60 | 123.51 |
| ZINC PPM | 123.70 | 141.99 |
| COPPER PPM | 613.30 | 703.97 |
| MAGNESIUM PPM | 858.80 | 985.77 |
| SULFUR % | 0.17 | 0.20 |
| MERCURY PPM | 0.00 | 0.00 |
| LEAD PPM | 9.70 | 11.13 |
| CADIMIUM PPM | 0.30 | 0.34 |
| ph | 6.60 | 6.60 |
| SaH - NaCL % | 0.30 | 0.34 |

In another embodiment the dried cellulose pellets are fed to a roller mill for sizing and shaping (commercially available model FRC 936 made by The Roskamp Company). The action of the roller mill produces an irregularly shaped pellet along with dust and particles of undesired size. By using a shaker screen, the undesired materials can be separated. In one preferred embodiment, the best density for a cellulose pellet for absorbing oil is in the density range of about 20 pounds of cellulose material per cubic foot to about 30 pounds per cubic foot. The irregularity of shape of this preferred embodiment is a somewhat flattened shape with more surface area than the shape of generally cylindrical non-flattened material of the prior art. Although the type and degree of irregularity as compared to a smooth cylindrical shape has not been quantified, applicants' pellets maintain their position in a first liquid to be absorbed which is floating on a second liquid; the pellets of desired density maintain their position while they are absorbing the first liquid and, in one embodiment, sink in and through the first liquid after absorbing some of the first liquid. The pellets need not become completely saturated with the first liquid; however, they should not be of such a configuration or of such a light density that they float on top of the first liquid without absorbing it or absorbing only an insignificant amount of it. Applicant's pellets cover the spectrum up to, but not including, pellets that sink immediately and, at the other end of the spectrum up to, but not including, pellets that float on the first liquid as described above. Of course sinking and floating can occur with different pellets on different first liquids. The preferred pellets (A,C,E) described above work well with a first liquid which is oil (e.g., crude oil or SAE 90 oil) floating on salt water. Configuration, size, and density can be varied depending on the nature of the first and second liquids.

To present the characteristics and qualities of certain preferred embodiments of pellets and methods according to the present invention, a study was conducted as reflected in Tables I, II, and III. Columns A through G represent data for cellulose pellets according to embodiments of the present invention. Column H presents data for Buckerfield material which is made from cellulose material and commercially available as Kitty Litter (TM). Column I presents data for low-density relatively flat pieces made from cellulose material and commercially available as Kitty Flush (TM). Column K presents data for grey fiber which is made from cellulose and is commercially available as insulation material.

Styrofoam cups were used as containers for salt water onto whose surface was introduced either SAE 90 grade oil or crude.

Each type of pellet was introduced into and onto each type of oil floating on 140 cc's of salty water in a cup which could hold about 200 cc's of liquid. One teaspoon of oil was poured slowly over the water in each cup.

(One teaspoon of SAE 90 grade oil weighed about 5.15 grams; one teaspoon of the viscous crude oil weighed about 4.23 grams). The surface area of the created oil films or slicks in the cups was about 4.91 square inches.

8 grams of each type of absorbent material were spread over the oil in each cup so that each type of absorbent material was used with each type of oil. At regular intervals of time, observations were made regarding the amount of oil absorbed and the amount of absorbent material which had sunk or was still on or in the oil.

Table I presents data for a testing situation in which the water/oil combination was at a temperature of 23 degrees Centigrade and the pH of the water was 7.68. After about 18 hours some of the materials were still floating on the surface of the water/oil combination; but a slight vibration of the cups caused the sinking of virtually all these floating materials.

Table II presents data for a testing situation in which the temperature of the water/oil combination was about 9 degrees Centigrade and the water pH was 8.02. After 20 hours the temperature had risen to 24 degrees Centigrade and some of the materials were still floating; again, a slight vibration caused them to sink.

Table III presents data on the densities of the various materials.

After two hours of such testing as reported in Tables I–III, it was discovered that under these conditions, absorption was faster and pellets sank faster in the warmer water at the lower pH with the lower density oil. After 18 to 20 hours of such testing, it became apparent that pellets sank more with the more viscous crude oil than in the SAE 90 oil. The Buckerfield material (type H) absorbed oil/water faster than the other materials and sunk to the bottom so relatively quickly (in about 10 minutes) that unabsorbed oil remained on the water's surface (about 8% to about 10% of the SAE 90 oil remained; about 15% to about 20% of the viscous oil remained). The flat pieces (type I) absorbed a significant amount of water and sank in about 20 minutes leaving behind about 10% of the SAE 90 oil and about 30% of the viscous oil.

The type C,F, and G pellets (Table I; Table II) of relatively high density (about 29 pounds of cellulose per cubic foot of pellets) were found to absorb oil faster than the other pellets. These pellets sank more in viscous oil than in SAE 90 oil.

Although the type A and B pellets had the same density (about 21.5 pounds of cellulose per cubic foot of pellets), the B pellets were smaller in size and surface area as compared to the A pellets. The B pellets absorbed oil and water more slowly than the A pellets and less of the B pellets sank than the A pellets.

All pellets can absorb both oil and water; but they can be preconditioned to absorb only oil or mostly oil by pretreating them with oil; e.g., spraying them with No. 2 diesel oil. Pellets treated in this way may not readily absorb water thus making them float on top of a first liquid, e.g., oil more readily so that a less dense pellet can be used (e.g., a pellet less dense than certain preferred pellets, a pellet less dense than 20 pounds of cellulose per cubic foot). It is preferred that pretreatment occur during the pellet manufacturing process, preferably prior to the final pelletizing step.

The type E,A, and C pellets performed better than the type B,D, and J (Cincinnati Fiber material) in SAE 90 oil-they absorbed more oil more quickly. Pellets of types A through G absorb the SAE 90 almost completely leaving little or no oil on the surface and about 1% of the oil around the edge of the cups, leaving the water looking clean. With the viscous oil, these pellets left about 2% to 3% of the oil behind around the edge of the cup. The grey fiber (type K) did not sink. These fibers were generally so light that they formed an agglomeration of fibers and floated on the surface. Fibers remaining above the agglomerated fibers did not absorb oil, even after about 18 to 20 hours. The fibers at the bottom of the agglomeration absorbed only about half of the oil.

The commercially available prior art Buckerfield's flushable cat litter (type H) is biodegradable and can absorb up to 150% of its own weight and it is described as useful for spilled oil.

The use of the word "pellet" herein regarding absorbing oil or other liquids floating on a second liquid includes a piece of material which functions as described to produce the desired results and is made by compressing cellulose material or its equivalent. Preferred pellets are irregular and have enough surface area to break the surface tension of a first liquid, e.g., oil, floating on a second liquid, e.g., water. In one embodiment the pellets can be pretreated with oil which makes them repel water so that a less dense pellet can be used for those applications in which sinking is not desired, i.e., in those applications in which the pellets after absorbing the first liquid are to be removed from the surface of the first liquid.

In various preferred embodiments of this invention, pellets are provided which can absorb liquid and from which the absorbed liquid can be recovered and subsequently disposed of or treated further or refined. For example, from pellets which have absorbed spilled crude oil, the crude oil can be extracted or squeezed out. Of course, the pellets can be recovered by any suitable manual or mechanical means from the surface, from beneath the surface, or from the bottom of the reservoir, bay, ocean, or container of the liquid. Recovered pellets can be disposed of without removing the absorbed liquid. Pellets which have absorbed a combustible material according to any of the previously described methods can be used as fuel or can be incinerated to dispose of them. Also, pellets in place on a first liquid floating on a second liquid can be set on fire to burn absorbed combustible material and to assist in the burning of liquid in which they are floating. It is also within the scope of this invention to provide agitation or vibration to a first liquid/second liquid combination to enhance either pellet absorption or sinking or both.

Regarding certain preferred embodiments in which the pellets sink after absorbing a material like oil, if the pellets and the oil will be biodegradable by natural causes, there may be no need to recover them.

In one preferred embodiment of a method according to this invention the use of a surfactant can decrease the amount of time for the pellets (which have absorbed a first liquid, such as oil) to sink. Using cups containing salty water with a heavy crude oil top film and cups containing salty water with a SAE 90 oil top film, pellets of types B through G (Table I) were sprinkled on the oil, one type of pellet per cup, a total, of 10 cups. After 10 minutes, the bulk of the oil has been absorbed in each cup and about 2% to 5% of the pellets had sunk to the bottom of the cups. Then a 0.1% solution of a surfactant (commercially available Witconate AOS (TM) surfactant) was misted onto the top of the still-floating pellets. Immediately almost all of the remaining pellets combined with oil and fell to the bottom of the containers.

The relative absorption rates of different amounts of pellets, pellets of types A,C,E,F, and G according to the present invention were demonstrated, again using the previously described styrofoam cups as reservoirs and using four cups of each type of pellet, placing 2,4,6, and 8 grams of each type of pellet on the oil film (5.15 grams of SAE 90 oil) in each cup. Pellets A,C,E were 20-22 pounds per cubic foot; types E and F, 29 to 30 pounds per cubic foot.

Pellets of types G and F are generally heavier and more uniformly round than pellets of types A,C, and E, and pellets of types E and F were more round than types A,C,E. At 20 minutes after sprinkling the pellets on the liquid, the cups with 4 and 6 grams of pellets of types A,C, and E exhibited the best oil absorption with E being the best. The cups with 8 grams of pellets of types A,C,E, and F showed generally good oil absorption. The type G pellets did not perform as well as the other types at any given weight. Also, after the pellets of type G in the cup with 4 grams of pellets had sunk, stirring the pellets caused release of some of the absorbed oil, and it floated up to the surface. Less absorbed oil was released by pellets of type E in the cup with 4 grams of pellets. Such stirring did not result in the release of oil from the pellets in cups with 6 or 8 grams of pellets. All the cups with only 2 grams of pellets had free unabsorbed oil at 20 minutes after sprinkling the pellets. Slight agitation of the cups containing 2 grams of pellets resulted in almost no pellets sinking. Spraying surfactant on the pellets still floating after about 25 minutes resulted in the sinking of almost all the pellets in the cups with 4,6, or 8 grams of pellets.

In testing the liquid retention of various types of cellulose fibers including Champions Mulch #1; Champions Mulch #2; Conwed Wood; Newsprint; Cardboard, 75% Newsprint/25% Cardboard; and 50% Newsprint/50% Cardboard; it was determined that 100% Newsprint was most absorbent and the mulches were the least absorbent. Regarding water absorption, tests revealed that the most absorbent material was Newsprint.

Mulch fiber was shown to be heavier compared to other fibers and it absorbed less water. Newsprint (100%) retained more water. Mulch retained the least.

By compressing cellulose material into pellets according to this invention, relatively more mass (higher density) is utilized in a smaller space to provide relatively more absorbability for a given volume and provide more control of a first liquid (e.g., spilled oil) floating on or in a second liquid (e.g., ocean water). However, in some embodiments, a density which results in premature pellet sinking is undesirable. Compressed pellets fashioned to provide control of an oil spill without sinking will facilitate recovery from the surface. Various biodegrading microorganisms that attack and degrade oil and other materials may be included in compressed pellets of this invention.

Figure 7:
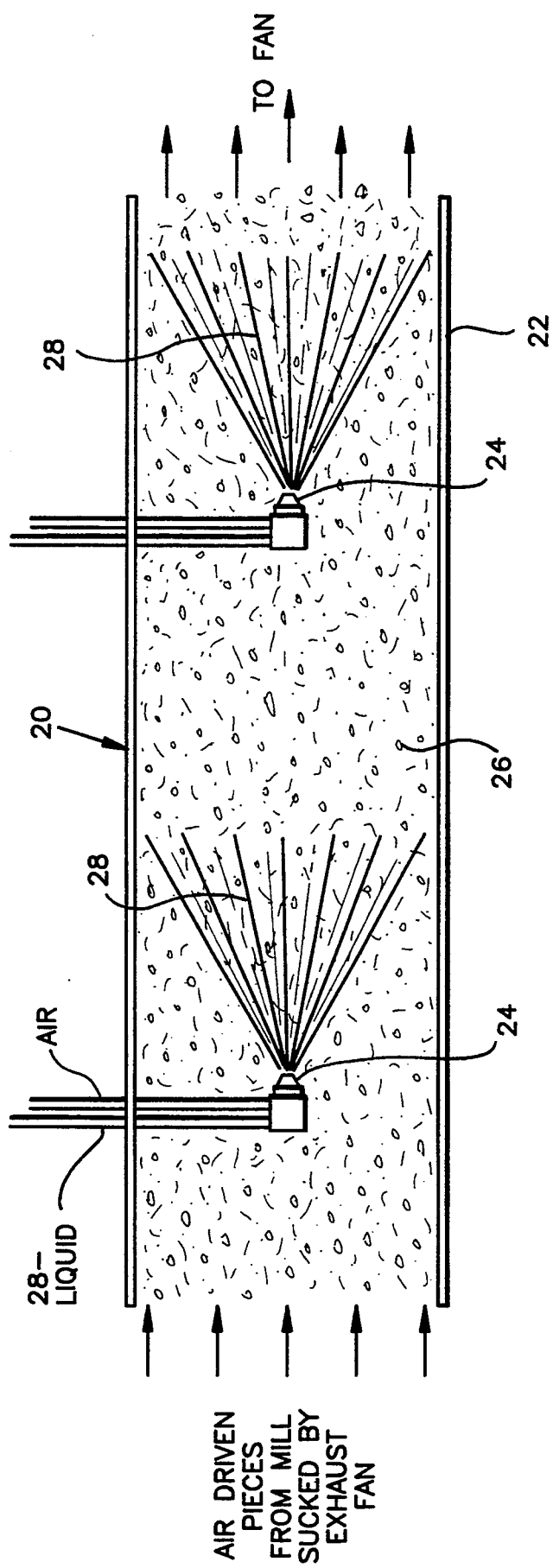
FIG. 7 is a side view in cross-section of a injection system according to the present invention.

In another embodiment of the present invention the reduced pieces of paper (preferably ranging in size between about one inch to about two and a half inches) are fed to a second stage finishing mill to produce pieces ranging preferably in size (largest dimension) between about one-eighth of an inch to about seven-sixteenths of an inch. These pieces are exhausted from the mill in its exhaust air stream and are directed into an injection system 20 as shown in FIG. 7. The system 20 has a central conduit or pipe 22 and one or more pressurized air-driven spray nozzles 24 which, preferably, spray a water/surface active agent mixture 28 in a direction parallel to and in the same direction as the flow of the cellulose pieces 26 (typically at an spray nozzle air pressure of about 30 p.s.i. for good atomization of the liquid). It is preferred that the pieces be conditioned by the spray to a water content between about 10% to about 22% by weight, with about 18% most preferred. It is preferred that the sprayed pieces have about $\frac{1}{2}$% to about 3% surface active agent by weight therein and/or thereon, with about $1\frac{1}{2}$% most preferred. It is preferred that the sprayed pieces be substantially coated with the water/surfactant mixture. Although it is preferred that the pieces be conditioned by spraying, they may be conditioned by immersion in a container of the mixture or the mixture may be poured onto the pieces, but these methods are not equivalent. The sprayed pieces may be used as they exit the injection system as absorbent material or they may be dried to a lower moisture content as desired, e.g. as low as 5% moisture by weight. Alternately, the sprayed pieces may be fed to a pelletizer to produce pellets as previously described herein. The pellets may be flaked and be used as litter as previously described herein. The surface active agent (such agents sometimes hereinafter referred to as "SAA") increases the material's rate of absorbency and its absorbent capacity. This occurs by reducing the surface tension of liquids and the interfacial tension between two liquids. This reduces waste and processing time (e.g., less screening of product is needed), results in a more consistent product, and reduces the amount of unwanted fine particles and dust.

In one specific preferred embodiment according to this invention pieces of newsprint with a largest dimension of about one inch to about two and a half inches were fed to a second stage finishing mill and reduced in size to about one-fourth of an inch. These pieces were exhausted from the mill in its air exhaust stream (typically at about 160 to 190 feet per second) and were directed into an injection system as shown in FIG. 7 in which a commercially available agent (e.g. Emcol 4500 or Witconate 1238) was applied evenly over substantially all the pieces substantially covering them and producing a product which was about 1 $\frac{1}{2}$ weight percent SAA (e.g. about 33 pounds of surface active agent mixed with about 415 pounds of water was sprayed onto about 2100 pounds of cellulose pieces resulting in a surface active agent content by weight of the pieces of about 1.57%). The product was then pelletized and flaked (as previously described herein) to a bulk density of about 9 to about 18 pounds per cubic foot. An odor identifier (e.g. oil of wintergreen) is added to the SAA to facilitate identification of SAA -treated product. For this embodiment it is preferred that flaking be accomplished with a crimper having dual opposed rollers rotating toward each other, one at 450 r.p.m. and the other at 1100 r.p.m. The surface active agent aids in producing a pellet and/or flake of desired hardness, density, temperature, heat holding capacity, and expansion rate by increasing water absorption rate and by more thoroughly wetting the pieces of cellulose.

The following table compares the absorbency of various substances by absorbent material according to this invention with and without SAA.

| Flaked Material #1 (50 grams) | | |
|---|---|---|
| Substance | Amt. Absorbed without SAA (grams) | Amt. absorbed with SAA (grams) |
| Water | 144 | 224 |
| 30 wt. Oil | 68 | 139 |
| Used Motor Oil | 89.2 | 127.6 |
| Antifreeze | 200.5 | 248 |
| Transmission Fluid | 71.3 | 111 |
| Diesel Oil | 50.6 | 89.8 |

(e.g. 50 grams of material #1 without SAA absorbed 68 grams of 30 wt. oil and 50 grams of material #1 with SAA absorbed 139 grams of 30 wt. oil). Material #1 was pelletized, flaked, absorbent material made as previously described. The absorption capacity by weight for, e.g., water of the material with SAA was about 4.4, i.e. 50 grams of the material absorbed about 4.48 times its own weight of water; for oil it is about 2.7. It is preferred that absorption capacity of water for flaked material with SAA be at least 4 and for oil be at least 2.4

| Absorbent Material #2 (50 grams) | | |
|---|---|---|
| Substance | Amt. Absorbed without SAA | Amt. Absorbed with SAA |
| Water | 392.8 | 650 |
| Mineral Spirits | 440.0 | 578 |

Material #2 was absorbent material as produced from the injection system as previously described without further processing (no pelletizing, no flaking). It is preferred that absorption capacity for absorbent material with SAA for water be at least 10 and for oil be at least 9.

In another embodiment of the present invention about ten grams of flaked material (density about 15 lbs./cubic foot) according to the present invention as previously described was used to absorb an oil/water mixture (80 grams 10W-30 motor oil, 60 grams water). The material absorbed 1.7 times its own weight of the mixture. Additional amounts of about ten grams of the material were treated to 1% by weight with the following commercially available hydrophobic agents and exhibited the listed absorption capacities:

| Material | Hydrophobic Agent | Absorption (times weight) |
|---|---|---|
| 1. | Paracol 802N | 1.94 |
| 2. | EW 58 | 2.07 |
| 3. | Bersize 6900 | 2.39 |

Upon adding a surface active agent Desonic 1.5N at 1.5% by weight to materials similar to materials 1,2, and 3 above, the following absorption capacities were noted:

| Material | Absorption |
|---|---|
| 1A. | 2.60 |
| 2A. | 2.88 |
| 3A. | 2.77 |

(1A corresponds to 1, etc.; 1A was about ten grams of the flaked absorbent material plus 1% by weight hydrophobic agent plus 1.5% by weight SAA, and similarly for the other materials.)

Upon adding a different surface active agent (1.5% by weight Desonic 4N) to about-ten-gram amounts of the absorbent material treated with the hydrophobic agents as with materials 1,2, and 3 above, the following absorption capacities were noted:

| Material | Absorption |
|---|---|
| 1B. | 2.88 |
| 2C. | 3.00 |
| 3C. | 2.80 |

These data show that adding a surface active agent to this material according to this invention treated with a hydrophobic agent increases absorption by weight.

Thus it is seen that the products and methods of the present invention readily achieve the ends and advantages mentioned as well as other inherent therein. While certain preferred embodiments of the present invention have been described and illustrated for the purposes of disclosure, it will be clear to one of skill in this art who has the benefits of this invention's creative teachings that changes in the preferred products and steps may be made within the scope of the appended claims and without departing from the spirit of the invention. It is realized that changes in the products or methods are possible and it is intended that each element or step recited in any of the following claims and each combination of elements or steps is to be understood as referring to all equivalent elements, steps, or combinations for accomplishing equivalent results in equivalent manner. These claims are intended to cover the invention as broadly as legally possible in whatever form it is utilized.

What is claimed is:

1. A method for producing absorbent material, the method comprising:
   grinding cellulose in sheet form producing ground cellulose,
   reducing the ground cellulose to pieces, and
   conditioning the pieces of cellulose with water and a surface active agent.

2. The method of claim 1 wherein the pieces of cellulose are conditioned to a water content between about 10% to about 22% by weight.

3. The method of claim 1 wherein the ground cellulose is reduced to pieces about one-eights inch to about seven-sixteenths inch in size.

4. The method of claim 1 wherein the ground cellulose is reduced to pieces by a first stage reducing device that reduces it to pieces about one inch to about two and one-half inches in size and then a second stage reducing device further reduces the pieces to about one-eight inch to about seven-sixteenths inch in size.

5. The method of claim 1 wherein the absorbent material is about 1½ percent by weight surface active agent.

6. The method of claim 1 wherein the pieces are conditioned with water and surface active agent by spraying the pieces with water and surface active agent.

7. The method of claim 6 wherein the pieces of cellulose are introduced in an air stream into a spray conditioning system and a spray of water and surface active agent is sprayed onto the pieces in a same direction as a direction of flow of the pieces.

8. The method of claim 1 comprising also adding a hydrophobic agent to the pieces.

9. The method of claim 1 wherein the absorbent materials absorption capacity for water is about 4.

10. The method of claim 9 wherein the absorption capacity for oil is about 2.4.

11. A method for producing absorbent material comprising:
grinding cellulose in sheet form to produce ground cellulose,
reducing the ground cellulose to pieces by reducing it with a first stage reducing device to pieces ranging in size between about one inch to about two and a half inches in size, and then reducing these pieces in a second stage reducing device to pieces ranging between about one-eight inch to about seven-sixteenths inches in size,
conditioning the pieces of cellulose with water and surface active agent by feeding them in an air stream to a spray conditioning system wherein a mixture of water and surface active agent is sprayed onto the pieces by spraying in a same direction as a direction of flow of the air stream.

12. A method for producing absorbent flaked material, the method comprising:
grinding cellulose in sheet form producing ground cellulose,
reducing the ground cellulose to pieces,
conditioning the pieces of cellulose with water and surface active agent,
pelletizing the conditioned pieces to form pellets, drying the pellets, and
compressing and flattening the pellets to produce the flaked material.

13. The method of claim 12 wherein the pieces of cellulose are conditioned to a water content between about 10% to about 22% by weight.

14. The method of claim 12 wherein the ground cellulose is reduced to pieces about one-eighth inch to about seven-sixteenths inch in size.

15. The method of claim 12 wherein the ground cellulose is reduced to pieces by a first stage reducing device that reduces it to pieces about one inch to about two and one-half inches in size and then a second stage reducing device further reduces the pieces to about one-eighth inch to about seven-sixteenth inch in size.

16. The method of claim 12 wherein the density of the produced material is between about 9 to about 18 pounds per cubic foot.

17. The method of claim 12 wherein the pieces are conditioned with water and surface active agent by spraying the pieces with water and surface active agent.

18. The method of claim 17 wherein the pieces of cellulose are introduced in an air stream into a spray conditioning system and a spray of water and surface active agent is sprayed onto the pieces in a same direction as a direction of flow of the pieces.

19. The method of claim 12 including adding an odor identifier to the material to facilitate identification of the material by odor.

20. A method for producing absorbent flaked material, the method comprising:
grinding cellulose in sheet form,
reducing the ground cellulose to pieces, about one-eighth inch to about seven-sixteenths inch in size,
conditioning the pieces of cellulose with water and surface active agent, the pieces of cellulose conditioned to a water content between about 10% to about 22% by weight, and to a surface active agent content of about 1½% by weight,
pelletizing the conditioned pieces to form pellets, drying the pellets, and
compressing and flattening the pellets to produce flaked material with a density between about 9 to about 18 pounds per cubic foot.

21. A method for producing absorbent flaked material method comprising:
grinding cellulose in sheet form to ground cellulose about one inch to about two and a half inches in size,
reducing the ground cellulose to pieces about one-eighth of an inch to about seven-sixteenths of an inch in size,
conditioning the pieces of cellulose with water and a surface active agent to a water content between about 10% to about 22% weight, and a surface active agent content of about 1½% by weight,
the water and surface active agent applied by spraying them onto the pieces,
pelletizing the conditioned pieces to form pellets, and
compressing and flattening the pellets to increase their surface area to produce a flaked material.

22. A method for producing animal litter, the method comprising:
grinding cellulose in sheet form to produce ground cellulose,
reducing the ground cellulose to pieces,
conditioning the pieces of cellulose with water and surface active agent,
pelletizing the conditioned pieces to form pellets, drying the pellets,
compressing and flattening the pellets to produce a flaked material useful as animal litter,
the density of the flaked material between about 9 to about 18 pounds per cubic foot, and
the moisture content of the flaked material between about 8% to about 12% by weight.

23. Absorbent material produced by the method of claim 1.

24. Absorbent material produced by the method of claim 11.

25. Absorbent flaked material produced by the method of claim 42.

26. Absorbent flaked material produced by the method of claim 20.

27. Animal litter produced by the method of claim 22.

28. Absorbent material produced by the method of claim 1 and having an absorption capacity for water of about 13.

29. Absorbent flaked material produced by the method of claim 12 and having an absorption capacity for water of about 4.

30. Absorbent flaked material produced by the method of claim 12 and having an absorption capacity for oil of about 2.4.

* * * * *